United States Patent
Eluard et al.

(10) Patent No.: US 8,869,292 B2
(45) Date of Patent: Oct. 21, 2014

(54) METHOD AND DEVICE FOR 3D OBJECT PROTECTION BY TRANSFORMATION OF ITS POINTS

(75) Inventors: Marc Eluard, Acigne (FR); Yves Maetz, Melesse (FR); Sylvain Lelievre, Montgermont (FR)

(73) Assignee: Thomson Licensing, Issy les Moulineaux (FR)

( * ) Notice: Subject to any disclaimer, the term of this patent is extended or adjusted under 35 U.S.C. 154(b) by 196 days.

(21) Appl. No.: 13/461,089

(22) Filed: May 1, 2012

(65) Prior Publication Data

US 2012/0299915 A1 Nov. 29, 2012

(30) Foreign Application Priority Data

May 24, 2011 (EP) .................................... 11305635

(51) Int. Cl.
*G06F 21/00* (2013.01)
*G06T 19/20* (2011.01)
*H04L 9/06* (2006.01)
*G09C 5/00* (2006.01)

(52) U.S. Cl.
CPC . *H04L 9/06* (2013.01); *G06T 19/20* (2013.01); *G09C 5/00* (2013.01); *G06T 2219/2021* (2013.01)
USPC ............ 726/26; 726/1; 726/2; 726/4; 726/17; 726/21; 726/27; 726/30; 713/165; 713/167; 713/187; 380/259; 380/28; 380/29; 380/30; 382/276; 382/277; 382/293; 382/295

(58) Field of Classification Search
USPC ............................ 726/1–4, 16–17, 21, 26–30; 713/164–167, 187; 380/259–260, 380/36–30; 382/276–308
See application file for complete search history.

(56) References Cited

U.S. PATENT DOCUMENTS

| | | | |
|---|---|---|---|
| 6,201,881 B1 * | 3/2001 | Masuda et al. | 382/100 |
| 6,678,378 B1 | 1/2004 | Akiyoshi | |
| 8,417,365 B2 * | 4/2013 | Crepeau et al. | 700/98 |
| 2007/0196030 A1 * | 8/2007 | Grimaud et al. | 382/276 |
| 2008/0022408 A1 | 1/2008 | Phelps | |

OTHER PUBLICATIONS

Protecting 3D Graphics Content by Koller et al; Publisher: ACM; Date: Jun. 2006.*
Ashourian et al., "A New Masking Method for Spatial Domain Watermarking of Three-Dimensional Triangle Meshes", IEEE TENCON 2003, Conference on Convergent Technologies for the Asia-Pacific Region, vol. 1, Bangalore, India, Oct. 15-17, 2003.
"Protected Interactive 3D Graphics is Remote Rendering", ACM Transactions on Graphics—ACM SIGGRAPH, Aug. 1, 2004.
European Search Report dated Oct. 28, 2011.

* cited by examiner

*Primary Examiner* — Madhuri Herzog
(74) *Attorney, Agent, or Firm* — Tutunjian & Bitetto, P.C.

(57) ABSTRACT

A 3D object is protected by a first device that receives the 3D object, generates translation vectors that are added to the points of the 3D object to obtain a protected 3D object, and outputs the protected 3D object. The protected 3D object is unprotected by a second device by receiving the protected 3D object, generating translation vectors that are subtracted from the points of the protected 3D object to obtain an unprotected 3D object, and outputting the unprotected 3D object. Also provided are the first device, the second device and computer readable storage media.

15 Claims, 2 Drawing Sheets

METHOD AND DEVICE FOR 3D OBJECT PROTECTION BY TRANSFORMATION OF ITS POINTS

This application claims the benefit, under 35 U.S.C. §119 of EP Patent Application 11305635.2, filed 24 May 2011.

TECHNICAL FIELD

The present invention relates generally to 3-D models and in particular to the protection of graphical objects of such models.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The use of three-dimensional (3D) objects has been increasing in the last years, particularly with the emergence of metaverses. There are multiple usages for 3D objects: socializing worlds, games, mirroring worlds, simulation tools, but also 3D User interfaces, animation movies and visual effects for television. Generally, 3D virtual objects represent real money value. In socializing worlds and games, players are selling virtual objects or avatars to other players for real money. Building an experienced character within an online game is a very lengthy process that can require hundreds of hours behind the keyboard. The 3D model of a real-world object from a simulation tool allows manufacturing the real (counterfeit) object and selling it. Leaking the 3D model for a scene of the next blockbuster from Hollywood studios may result in bad press for the studios. As can be seen, in many cases, 3D objects are assets of great value for their owner.

Strategies for content protection comprise confidentiality protection—intended to make it impossible for unauthorized users to access the content, e.g. by encryption—and watermarking—intended to make it possible to track a user who has disseminated the content without authorization to do so.

Basic methods of 3D content protection focus on the entire data, i.e. all the data is either encrypted or watermarked (or both), although these methods are somewhat crude.

More subtle ways of protecting 3D content is to protect one or more of its 3D objects. This is possible as 3D content often is made up of a number of distinct objects positioned in a setting. When each 3D object is coded as a separate entity, it becomes possible to protect each of these separately and it is not necessary to protect all of them.

For example, US 2008/0022408 describes a method of 3D object protection by storing the "bounding box" of the object as non-encrypted data in one file and the protected 3D object as encrypted data in a separate file. Any user may access the non-encrypted data, but only authorized users can access the encrypted data; non-authorized users see a basic representation thereof (i.e. the bounding box), such as a parallelepiped instead of a car. However, this method was developed to be used with 3D rendering software and is less suited for multimedia content, such as video and film. In addition, the file format (one file with non-encrypted data and one file with encrypted data) is non-standard and is thus usable only by adapted rendering devices, not standard ones. Indeed, the encrypted data does not respect the syntax of most 3D techniques and can thus normally not be used.

U.S. Pat. No. 6,678,378 describes a solution for protecting a 3D Computer Aided Design (CAD) object by encryption. The solution may encrypt one of the coordinate values of the nodes and the equations for the edges or the contours, by nonlinear or affine transformation, thereby distorting the 3D object or by 'normal' encryption such as RSA.

Problems with this solution is that the calculations may be costly (in particular when using RSA) and that the distortions may not be sufficient to deter a malicious user from using the content nevertheless. In addition, in the case of 'normal' encryption, the 3D object may not be readable at all by a content consuming device—such as a computer or a television—which may be a drawback in some cases.

A digital rights enabled graphics processing system was proposed in 2006 by Shi, W., Lee, H., Yoo, R., and Boldyreva, A: A Digital Rights Enabled Graphics Processing System. In GH '06: Proceedings of the 21 st ACM SIGGRAPH/EUROGRAPHICS symposium on Graphics hardware, ACM, 17-26.]. With this system, the data composing the 3D object (collection of vertices, textures) is encrypted. Their decryption is handled within the Graphic Processing Unit, under control of licenses. It is proposed also to use multi resolution meshes to deliver simultaneously a protected and unprotected version of a 3D element. Although the system itself is a real progress towards secure 3D environments, the use of protected scenes with other Virtual Reality Modelling Language (VRML) renderers will lead to interoperability issues.

David Koller and Marc Levoy describe a system for protection of 3D data in which high-definition 3D data is stored in a server. The users have access to a low-definition 3D object that they can manipulate and when a user has chosen a view, a request is sent to the server that returns a two-dimensional JPEG that corresponds to the view. Hence the high-definition 3D data is protected as it is never provided to the users. (See "Protecting 3D Graphics Content" by David Koller and Marc Levoy. Communications of the ACM, June 2005, vol. 48, no. 6.) While this system works well for its intended use, it is not applicable when the full 3D data is to be transferred to a user.

A common problem with the prior art solutions is that they are not format preserving, but that they are based on the encryption of 3D data and that they provide a second set of 3D data that is usable by non-authorized devices so that the user can see something, e.g. a bounding box.

European patent application 10305692.5 describes a format preserving solution in which a 3D object comprising a list of points (i.e. vertices) is protected by permuting the coordinates of at least some of its points. European patent application 10306250.1 describes a similar solution in which the coordinates of at least one dimension of the vertices of a 3D object are permuted independently of the other dimensions. The lists detailing how the points are connected remain unchanged, but the 3D object no longer "makes sense" as these points no longer have the initial values. Advantages of these solutions is that the protected 3D object is readable also by devices that are not able to 'decrypt' the protected 3D object—although it does look very strange—and that the protected 3D object is inscribed in a bounding box of the same size as the original 3D object.

While the latter solutions work well, it will be appreciated that there may be a need for an alternative solution that can enable protection of 3D objects with quick calculations that still enables an unauthorized content consuming device to read and display the 3D object, albeit in a manner that renders the viewing thereof unsatisfactory. The present invention provides such a solution.

SUMMARY OF INVENTION

In a first aspect, the invention is directed to a method of protecting a graphical object. A device receives the graphical object comprising a plurality of points; obtains a protected graphical object by, for each of at least some of the plurality of points: generating a translation vector and transforming the point by adding the point to the translation vector, and outputs the protected graphical object that is visually different from the graphical object.

In a first preferred embodiment, the graphical object is a three-dimensional object.

In a second preferred embodiment, the translation vector is generated using a key-based generator function using a secret value.

It is advantageous that the graphical object is associated with a bounding box and that it is verified if the translation vector would result in a transformed point outside the bounding box and, if this is the case, the translation vector is adjusted modulo a size of the bounding box for at least one dimension so that the transformed point will be located within the bounding box.

It is further advantageous to use at least one of a lower bound and an upper bound to control at least one value of the translation vector.

In a second aspect, the invention is directed to a method of unprotecting a protected graphical object. A device receives the protected graphical object comprising a plurality of points, obtains an unprotected graphical object by, for each of at least some of the plurality of points: generating a translation vector and transforming the point by subtracting the point from the translation vector; and outputs the unprotected graphical object.

In a first preferred embodiment, outputting comprises rendering.

In a third aspect, the invention is directed to a device for protecting a graphical object. The device comprises a processor configured to receive the graphical object comprising a plurality of points; obtain a protected graphical object by, for each of at least some of the plurality of points: generating a translation vector; and transforming the point by adding the point to the translation vector; and output the protected graphical object that is visually different from the graphical object.

In a fourth aspect, the invention is directed to a device for unprotecting a protected graphical object. The device comprises a processor configured to receive the protected graphical object comprising a plurality of points; obtain an unprotected graphical object by, for each of at least some of the plurality of points: generating a translation vector and transforming the point by subtracting the point from the translation vector; and output the unprotected graphical object.

In a first preferred embodiment, processor is further configured to use a key-based generator function using a secret value to generate the translation vector.

It is advantageous that the graphical object is associated with a bounding box and that the processor is further configured to verify if the translation vector would result in a transformed point outside the bounding box and, if this is the case, to adjust the translation vector modulo a size of the bounding box for at least one dimension so that the transformed point will be located within the bounding box It is further advantageous that the processor is further configured to generated the translation vector using at least one of a lower bound and an upper bound to control at least one value of the translation vector.

In a second preferred embodiment, the graphical object is a three-dimensional object.

In a fifth aspect, the invention is directed to a computable readable storage medium comprising stored instructions that when executed by a processor performs the method the first aspect of the invention.

In a sixth aspect, the invention is directed to a computable readable storage medium comprising stored instructions that when executed by a processor performs the method the first aspect of the invention.

BRIEF DESCRIPTION OF DRAWINGS

Preferred features of the present invention will now be described, by way of non-limiting example, with reference to the accompanying drawings, in which.

DESCRIPTION OF EMBODIMENTS

In some 3D content formats, such as for example Virtual Reality Modelling Language (VRML) and X3D, a 3D graphical object ("3D object") is represented as a first list (or array) of points, wherein each point has a set of specific coordinates, and a second list with information on how to link the points together.

A salient inventive idea of the present invention is to protect a 3D object by performing a cryptographic algorithm, preferably a key-based transformation of the coordinates of the points for at least one dimension in the first list. The transformation results in a creation of a new set of points so that the protected 3D object is still understood by any standard 3D model rendering application, but the resulting display becomes weird and hardly usable to a viewer. In other words, the 3D object is encrypted. The skilled person will appreciate, in particular in view of the description hereinafter, that a difference compared to the solutions in EP 10305692.5 and EP 10306250.1 is that new coordinate values are created according to the present invention.

Authorized users have the means to reverse the transformation to obtain the original points.

Figure 1:
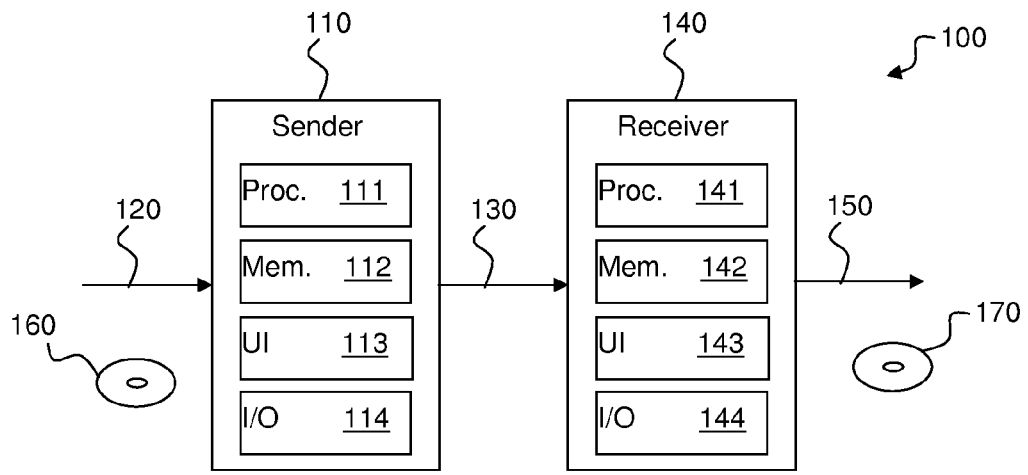
FIG. 1 illustrates a system for protecting a 3D object according to a preferred embodiment of the present invention.
Figure 2:
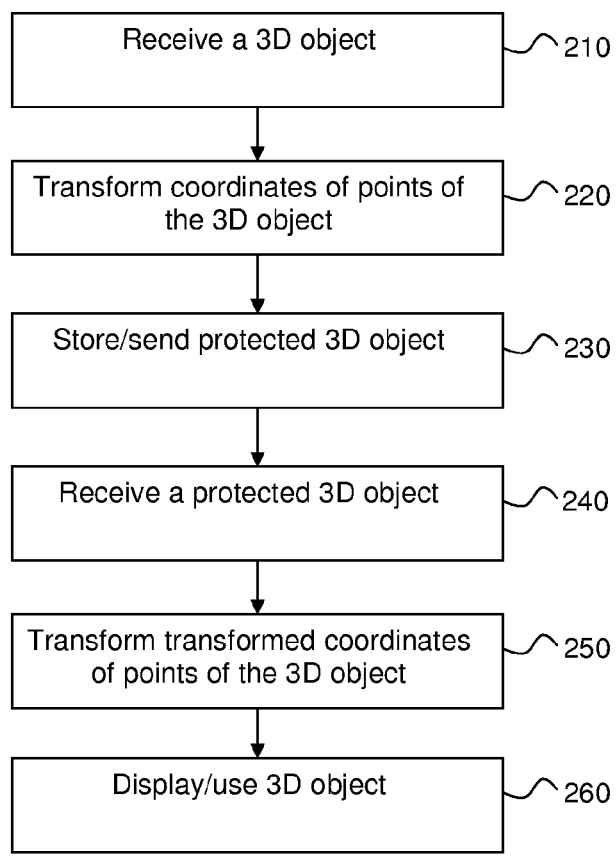
FIG. 2 illustrates a method for protecting a 3D object according to a preferred embodiment of the present invention.

FIG. 1 illustrates a system 100 for protecting a 3D object according to a preferred embodiment of the present invention and FIG. 2 illustrates a method for protecting a 3D object according to a preferred embodiment of the present invention. As a non-limitative example, the points correspond to the vertices of the surfaces composing the graphical object and are expressed in 3D coordinates, and the second list comprises information on how to link the vertices together to form lines and surfaces. The transformation may be performed on the static part (Coordinate node in VRML syntax) or the animation part (CoordinateInterpolator node in VRML syntax), or preferably both. In other words, it is the representation of the 3D object that is protected, which makes the correct rendering of the object impossible.

The system 100 comprises a sender 110 and a receiver 140, each comprising at least one processor 111, 141, memory 112, 142, preferably a user interface 113, 143, and at least one input/output unit 114, 144. The sender 110 may for example be a personal computer or a workstation, while the receiver 120 for example may not only be a personal computer or a workstation, but also a television set, a video recorder, a set-top box or the like.

The sender 110 receives 210 a 3D object 120 to be protected, uses a key to transform 220 at least one of the x-coordinates, the y-coordinates, and the z-coordinates (preferably all three and preferably independently of the other dimensions) of the points of the 3D object 120 to obtain a protected 3D object 130 that is stored or sent 230 to the receiver 140.

The coordinates are transformed as follows. For each point $P=(x,y,z)$ to be protected, a translation vector $(a,b,c)$ is generated, where $(a,b,c)=f(\text{secret})$ and f is a key-based generator function. The translation vector $(a,b,c)$ is then added to the point $P=(x,y,z)$ to generate a protected point $P'=(x',y',z)$. In other words:

$$(x',y',z)=(x+a,y+b,z+c).$$

The protected points depend on the translation vectors, which in turn depend on the key-based generator function f(secret).

According to a first variant, f uses a key-based pseudo-random generator with the secret as input parameter. With such a function, the operation is very simple but there is little or no control of the size of the bounding box of the transformed object.

According to a second variant, f uses a key-based pseudo-random generator to generate values respecting additional constraints in order to adjust the impact of the deformation. A first example consists in respecting the bounding box. In this case, the translation is calculated modulo the size of the relevant dimension of the bounding box. In this case, there is no 'explosion' of the model; the bounding box of the object does not increase in size. The bounding box and the original point must be specified as additional parameters of the function f.

As an illustration of the second variant, imagine one-dimensional bounding box from 1 to 10 with a point to protect at 8. If the translation vector is, say, 6, then this would result in a point outside the bounding box at 14. To avoid this, the translation vector is adjusted by the size of the bounding box: 6 (the initial translation vector)−10 (the size of the bounding box)=−4 (the final translation vector). Adding the translation vector to the point gives 8+(−4)=4.

At the receiver, the reverse calculations also result in a point outside the bounding box: 4 (the 'protected' point)−6 (the initial translation vector 'in the opposite direction')=−2. As this is outside the bounding box, the translation vector is adjusted by the size of the bounding box: 6−10=−4. This value is then subtracted from the 'protected' point: 4−(−4)=8, which is the initial value. Another way of seeing this is that the size of the bounding box (10) is added to the value of the point outside the bounding box, i.e. −2+10=8, which is the same result.

A second example is to limit the impact of the deformation by controlling the values of the translation vector within a preferably predetermined range. The range may be expressed as one or more additional input parameters, i.e. lower and upper bounds or a certain percentage of the bounding box (that may be different for each dimension). In this case, the 'explosion' of the model is controlled.

On the receiving side, the receiver 120 receives 240 the protected 3D object 130, restores 250 the points by inversing the transformation of the transformed coordinates using the secret (whose distribution to the receiver is beyond the scope of the present invention), and may then display or otherwise use 260 the unprotected 3D object 150. Put another way, the receiver uses the function f(secret) to generate a translation vector $(a,b,c)$ that is subtracted from the protected point; $(x,y,z)=(x=a,y=b,z=c)$. It should be noted that the initial 3D object 120 and the unprotected 3D object 150 are identical.

As a result, an authorized user will not notice anything out of the ordinary since all objects will be displayed correctly, while an unauthorized user will see the overall scene with the protected object or objects rendered in an incorrect way.

A first computable readable storage medium 160 comprises stored instructions that when executed by the processor 111 of the sender 110 protects the 3D object as described. A second computable readable storage medium 170 comprises stored instructions that when executed by the processor 141 of the receiver 140 unprotects the 3D object as described.

Figure 3:
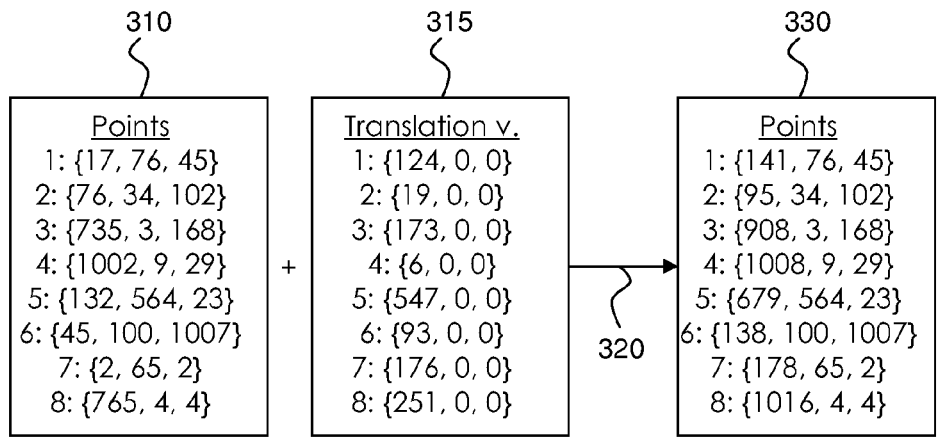
FIGS. 3 and 4 illustrate different aspects of 3D object protection according to a preferred embodiment of the present invention.
Figure 4:
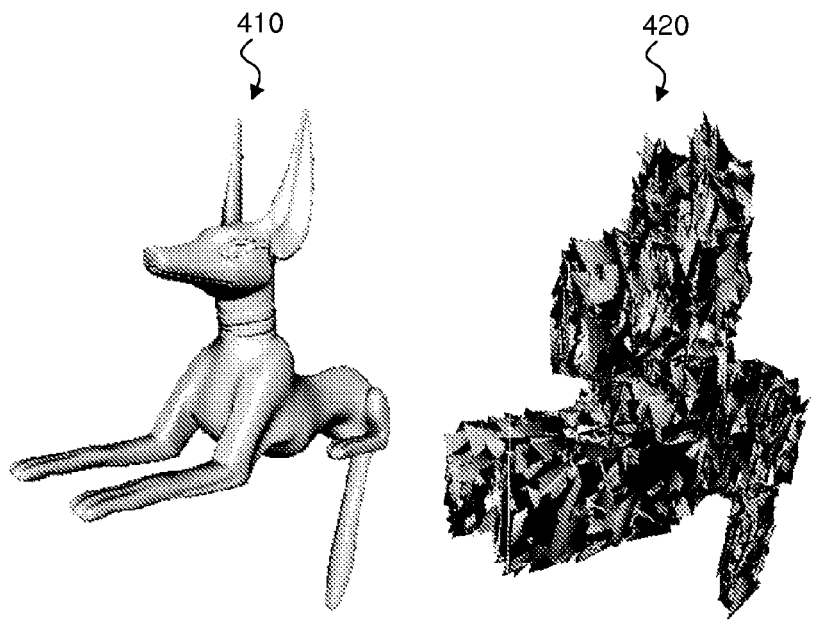

FIGS. 3 and 4 illustrate different aspects of 3D object protection according to a preferred embodiment of the present invention. FIG. 3 shows an unprotected list of points 310—for example the static part of the object—that after transformation 320 becomes a protected list of points 330. As an example, only the x-coordinate values have been transformed, while the y-coordinate values and the z-coordinate values remain unchanged. In FIG. 3, the indices are shown to the left of the set of coordinate values and the translation vector 315 (comprising only the value a and zeroes as only the x-coordinate is transformed) is seen between the unprotected list 310 and the protected list 330.

It can be seen that the x-coordinates are different in the two lists; for example, for index 1, the original x-coordinate (17) at is added to the x-coordinate of the translation vector (124), which yields a translated x-coordinate of the protected point (141). FIG. 4 illustrates the rendering of 3D objects: a rendered unprotected 3D object 410 is shown next to a rendered protected 3D object 420 to enable comparison between them. As can be seen, the rendered protected 3D object 420 only has a faint resemblance to the unprotected 3D object 410. This is due to the fact that the translation vectors were generated according to the second example of the second variant, i.e. the size of the vectors was limited.

In an alternative embodiment, the points of the 3D graphical object correspond to the mapping of textures on the surfaces composing the graphical object and are expressed in two-dimensional coordinates.

The skilled person will appreciate that user authorization and key management are out of the scope of the present invention.

It may thus be seen that the coordinates are transformed. A traditional approach would be to encrypt vertex data, which at best would result in having random points spread all over the 3D space and overlapping with the other objects of the complete scene; at worst, it would not at all be possible to render the 3D object. With the approach of the present invention, the protected 3D object stays generally gathered together, possibly even within the geometrical limits of the original, i.e. unprotected, 3D object. Therefore, when the user is not authorized to unprotect one object, it is possible that the overall scene is not too confused by the display of this protected object.

While the invention has been described for three dimensions, it may also be applied to protect objects in other dimensions, not only one but also two or any number of dimensions above three.

It will thus be appreciated that the present invention can provide a mechanism for ensuring the confidentiality of 3D models, and that the mechanism can visually differentiate protected and non-protected models for non-authorized users. It will also be appreciated that the protected 3D object (and the scene comprising the 3D object) can always be rendered, although it will be more or less recognizable, depending on the limitations constraints used for the key-based generator.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method of protecting a graphical object, the method comprising the steps, in a device, of: receiving the graphical object comprising a plurality of points; obtaining a protected graphical object by, for each of at least some of the plurality of points: generating a translation vector; and transforming a point by adding the point to the translation vector; and outputting the protected graphical object that is visually different from the graphical object;
wherein the translation vector is generated using a key-based generator function using a secret value; and
wherein the graphical object is associated with a bounding box and the method further comprises verifying if the translation vector would result in a transformed point outside the bounding box and, if this is the case, adjusting the translation vector modulo a size of the bounding box for at least one dimension so that the transformed point will be located within the bounding box.

2. The method of claim 1, wherein the graphical object is a three-dimensional object.

3. A method of protecting a graphical object, the method comprising the steps, in a device, of:
receiving the graphical object comprising a plurality of points;
obtaining a protected graphical object by, for each of at least some of the plurality of points:
generating a translation vector; and
transforming a point by adding the point to the translation vector; and
outputting the protected graphical object that is visually different from the graphical object;
wherein the translation vector is generated using a key-based generator function using a secret value; and
wherein at least one of a lower bound and an upper bound is used to control at least one value of the translation vector.

4. A method of unprotecting a protected graphical object, the method comprising the steps, in a device, of:
receiving the protected graphical object comprising a plurality of points;
obtaining an unprotected graphical object by, for each of at least some of the plurality of points:
generating a translation vector and transforming a point by subtracting the point from the translation vector; and
outputting the unprotected graphical object;
wherein the translation vector is generated using a key-based generator function using a secret value; and
wherein the graphical object is associated with a bounding box and the method further comprises verifying if the translation vector would result in a transformed point outside the bounding box and, if this is the case, adjusting the translation vector modulo a size of the bounding box for at least one dimension so that the transformed point will be located within the bounding box.

5. The method of claim 4, wherein outputting comprises rendering.

6. A device for protecting a graphical object, the device comprising a computer memory storing a computer program and a processor for executing the computer program, said device being configured to:
receive the graphical object comprising a plurality of points;
obtain a protected graphical object by, for each of at least some of the plurality of points:
generating a translation vector; and
transforming a point by adding the point to the translation vector; and
output the protected graphical object that is visually different from the graphical object;
wherein the translation vector is generated using a key based generator function using a secret value; and
wherein the graphical object is associated with a bounding box and the processor is configured to verify if the translation vector would result in a transformed point outside the bounding box and, if this is the case, adjust the translation vector modulo a size of the bounding box for at least one dimension so that the transformed point will be located within the bounding box.

7. A device for unprotecting a protected graphical object, the device comprising a computer memory storing a computer program and a processor for executing the computer program, said device being configured to:
receive the protected graphical object comprising a plurality of points;
obtain an unprotected graphical object by, for each of at least some of the plurality of points:
generating a translation vector; and
transforming a point by subtracting the point from the translation vector; and
output the unprotected graphical object wherein processor is further configured to use a key-based generator function using a secret value to generate the translation vector; and
wherein the graphical object is associated with a bounding box and wherein the processor is further configured to verify if the translation vector would result in a transformed point outside the bounding box and, if this is the case, to adjust the translation vector modulo a size of the bounding box for at least one dimension so that the transformed point will be located within the bounding box.

8. A device for unprotecting a protected graphical object, the device comprising a computer memory storing a computer program and a processor for executing the computer program, said device being configured to:
receive the protected graphical object comprising a plurality of points;
obtain an unprotected graphical object by, for each of at least some of the plurality of points:
generating a translation vector; and
transforming a point by subtracting the point from the translation vector; and
output the unprotected graphical object;
wherein processor is further configured to use a key-based generator function using a secret value to generate the translation vector; and
wherein the translation vector is generated using at least one of a lower bound and an upper bound to control at least one value of the translation vector.

9. The device of claim 7, wherein the graphical object is a three-dimensional object.

10. A non-transitory computable readable storage medium comprising stored instructions that when executed by a processor performs the method of claim 1.

11. A non-transitory computable readable storage medium comprising stored instructions that when executed by a processor performs the method of claim 7.

12. A non-transitory computable readable storage medium comprising stored instructions that when executed by a processor performs the method of claim 3.

13. A non-transitory computable readable storage medium comprising stored instructions that when executed by a processor performs the method of claim 8.

14. A device for protecting a graphical object, the device comprising a computer memory storing a computer program and a processor for executing the computer program, said device being configured to:
   receive the graphical object comprising a plurality of points;
   obtain a protected graphical object by, for each of at least some of the plurality of points:
   generating a translation vector; and
   transforming a point by adding the point to the translation vector; and
   output the protected graphical object that is visually different from the graphical object;
   wherein the translation vector is generated using a key based generator function using a secret value; and
   wherein at least one of a lower bound and an upper bound is used to control at least one value of the translation vector.

15. A method of unprotecting a protected graphical object, the method comprising the steps, in a device, of:
   receiving the protected graphical object comprising a plurality of points;
   obtaining an unprotected graphical object by, for each of at least some of the plurality of points:
   generating a translation vector and transforming a point by subtracting the point from the translation vector; and
   outputting the unprotected graphical object;
   wherein the translation vector is generated using a key-based generator function using a secret value; and
   wherein at least one of a lower bound and an upper bound is used to control at least one value of the translation vector.

* * * * *